May 29, 1962     C. E. MacKINNON     3,036,896
SALT DISSOLVER

Filed Jan. 5, 1961     3 Sheets-Sheet 1

INVENTOR.
CHARLES E. MacKINNON
BY
Beau, Brooks, Buckley & Beau.
ATTORNEYS

May 29, 1962

C. E. MacKINNON 3,036,896

SALT DISSOLVER

Filed Jan. 5, 1961

INVENTOR.
CHARLES E. MacKINNON
BY
Beau, Brooks, Buckley + Beau.
ATTORNEYS

May 29, 1962

C. E. MacKINNON 3,036,896

SALT DISSOLVER

Filed Jan. 5, 1961

INVENTOR.
CHARLES E. MacKINNON
BY
Beau, Brooks, Buckley & Beau.
ATTORNEYS

United States Patent Office 3,036,896
Patented May 29, 1962

3,036,896
SALT DISSOLVER
Charles E. MacKinnon, Lewiston, N.Y., assignor to International Salt Company, Inc., Clarks Summit, Pa.
Filed Jan. 5, 1961, Ser. No. 80,782
4 Claims. (Cl. 23—272.6)

This invention relates to improvements in brine producing and filtering apparatus; and more particularly to improvements in the so-called "down flow" type which employ the various commercially available grades and sizes of industrial salts. Whereas several "up flow" type dissolvers are still in current use and may be satisfactory for certain applications, it is clearly recognized in the industry that this type involves an inherent disadvantage in that relatively fine solid salt particles in the dissolution bed tend to float upwardly and out through the brine withdrawal device. Hence, if such an apparatus is employed in an operation requiring clear brine, a second operation must be performed to remove the entrained solids. Downflow dissolvers avoid the above mentioned difficulties but for various reasons have heretofore involved other inherent disadvantages which the present invention overcomes; and thus the present invention relates to improvements in apparatus for the purposes disclosed for example in U.S. Patent No. 1,928,008.

The apparatus of the present invention is designed to dissolve salt in improved manner in connection with such apparatus of the down-flow type, and more specifically, the apparatus of the present invention is designed to operate as aforesaid at a higher practicable rate of brine withdrawal, compared to prior art similar size dissolvers of the same type.

In order to eliminate the necessity of feeding such apparatus with salt constantly and uniformly at the rate of salt consumption as brine, it is customary in the art to provide supplemental salt storage hopper space above the elevation of the liquid level in the dissolver. This permits the dissolvers to be loaded with reserve salt supplies at intervals, thereby rendering the salt supply operation more practicable. However, as will be explained more fully hereinafter, whenever the salt supply extends above the liquid level in the dissolver a "critical rate" of brine withdrawal phenomena occurs, which effectively limits the maximum rate of brine withdrawal to something less than the rate indicated by the pump capacity and the corresponding fresh water inlet capacities.

It may be stated that a primary object of the present invention is to provide in an apparatus of the character referred to, means permitting practical operation of the apparatus at a higher rate of brine withdrawal; but other objects and advantages of the invention will be apparent from the specification hereinafter.

Figure 1:
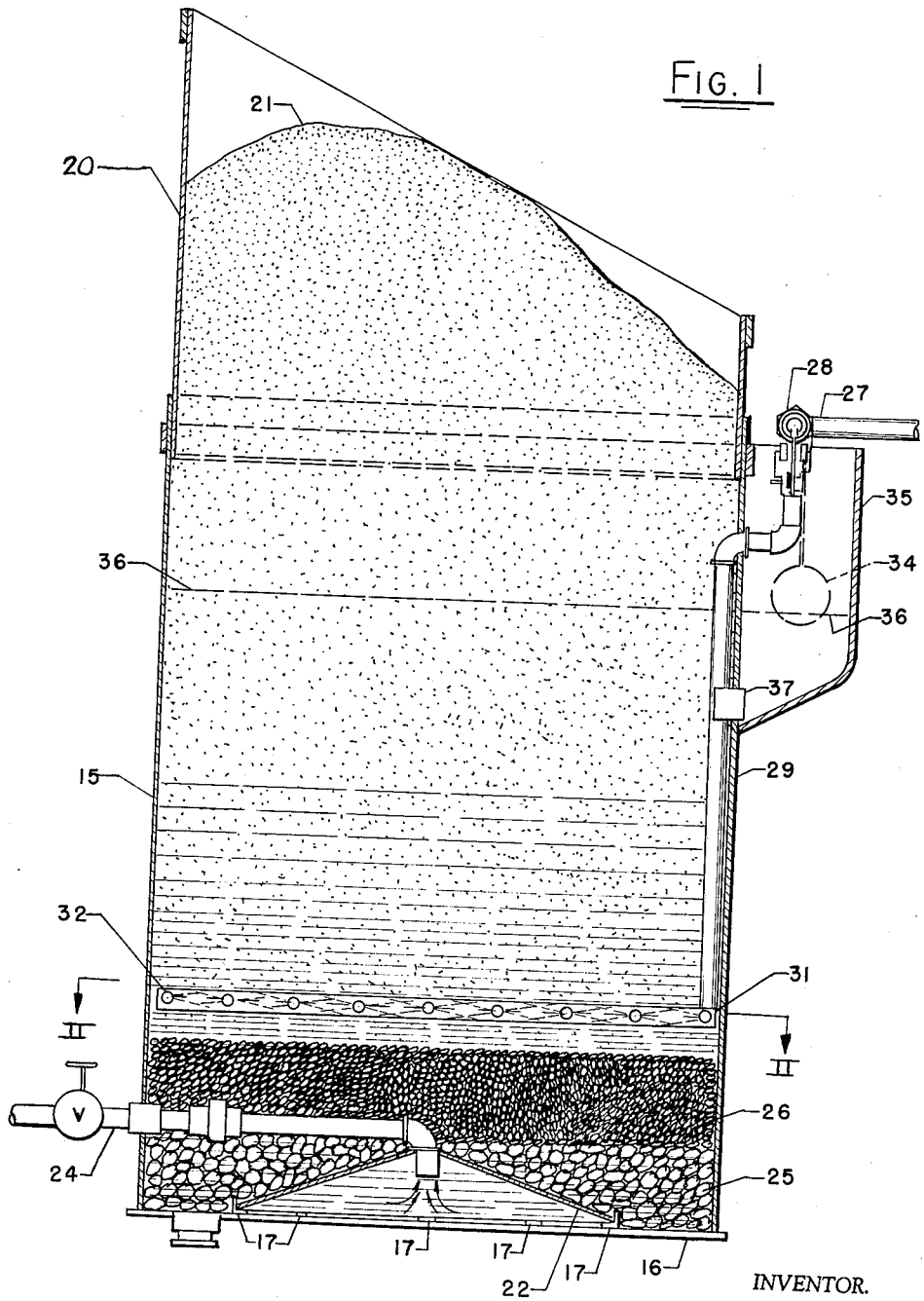
FIG. 1 is a vertical section of a salt dissolving apparatus constructed according to one possible embodiment of the invention.
Figure 2:
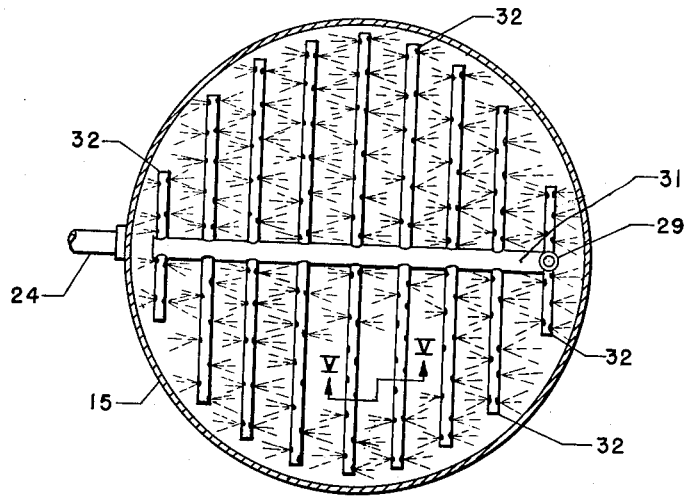
FIG. 2 is a section on reduced scale taken along line II—II of FIG. 1, and showing one form of solvent feed component of the apparatus.

Referring now specifically to FIGS. 1–2 of the drawing, the invention is illustrated therein as being embodied in a salt dissolving apparatus including generally a cylindrical tank or vat 15 having a bottom 16. The tank is fitted with a supplemental hopper 20 to provide a salt storage space from which the salt supply as indicated at 21 gravity-feeds into the tank 15, as required. Thus, the salt supply may be either continuously or batch-loaded into the hopper 20, so as to provide a constantly available supply which will feed automatically into the tank 15 in accord with the requirements of the system as will be explained more fully hereinafter.

In the drawing herewith, the brine withdrawal device includes conically shaped canopy 22 mounted within the tank, with the perimetral portion of the canopy disposed in slightly vertically spaced relation above the tank bottom plate 16, as by means for example of spaced apart blocks as indicated at 17; thereby providing a brine collection chamber into which the brine withdrawal conduit 24 connects. Differently sized gravel beds as indicated at 25—26 are perferably disposed in the bottom of the tank to cover the canopy 22 and to filter the brine as it travels toward the interior of the canopy.

Figure 5:
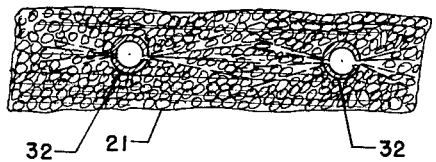
FIG. 5 is a fragmentary sectional view, on enlarged scale, of a detail of FIG. 1.

As is conventional, a salt solvent such as water is introduced into the tank by means of a inlet pipe or conductor 27 which leads through a valve 28 and thence into a feed pipe as indicated at 29. Conventionally, the feed pipe will connect into a spray ring as indicated at 30 (FIG. 6) extending around the inside wall of the tank, but in accordance with the present invention however, the feed pipe connects to a manifold pipe 31 which extends transversely of the tank interior and from which branch out in both horizontal directions a series of delivery tubes 32. The tubes 32 are formed with spray apertures directed horizontally; and thus as shown in FIGS. 1, 2, the liquid is dispersed within the surrounding salt mass in such manner as to provide a substantially solid liquid table or layer of uniform depth (FIG. 5) extending crosswise of the tank 15 and above the level of the brine withdrawal zone at the bottom end of the tank.

A float device 34 in a float chamber 35 is arranged to control the valve 28 automatically, so that a maximum liquid level may be maintained within the tank, such as at the level indicated by the numeral 36. A liquid level equalizer port 37 is provided in the wall of the tank for this purpose. Thus, it will be appreciated that whenever brine is withdrawn through the pipe 24, a fresh supply of brine filters through the lower portion of the salt bed 21 and thence through the gravel beds 26—25, and thence into the canopy for withdrawal through the conduit 24. Coincidentally with such brine withdrawal a new supply of fresh solvent is let into the tank through the valve 28 from the supply pipe 27; and thus the brine producing operation is continuous and normally balances the requirements of the brine consuming operation.

Whereas apparatus of the type referred to are usually designed for fresh water inlet at a rate exceeding the anticipated maximum rate of brine withdrawal, the prior art devices are nevertheless defective in use when it is attempted to withdraw brine at the maximum indicated rate, due to the existence of a "critical rate" of brine withdrawal which is due to the preferential flow of air rather than solvent through the salt feed mass. Otherwise stated, as the brine withdrawal pumping rate is increased, the suction produced at the pump inlet, and existing within the canopy 22, is sufficient to draw air from above the liquid level 36 down through the wetted salt mass and into the brine withdrawal pump. As explained hereinabove, this tendency is prevalent because of the relative ease with which air may travel through the salt mass as compared to the travel of liquid therethrough under the then existing pressures. Any entrance of air into the brine pumping system seriously lowers the efficiency of the system, and may even render the pump inoperative. Furthermore, in many instances of brine usage, the presence of air in the brine is objectionable and/or may be seriously detrimental to the process.

The present invention, however, provides means for elimination of the above referred to "critical rate" effect, and provides a system whereby the useful rate of brine withdrawal is limited only to the capacity of the brine pump and/or the comparable capacity of the fresh water inlet system. The invention accomplishes this purpose by virtue of the novel provision of a constantly replenished liquid table which seals off any air ingress at an elevation above the brine collector, regardless of the level of liquid in the upper portion of the tank as controlled by the float chamber device. Thus, any air channeling tendency within the salt mass is blocked at the level of the air sealing table in the region of the water feed tubes 32.

Figure 3:
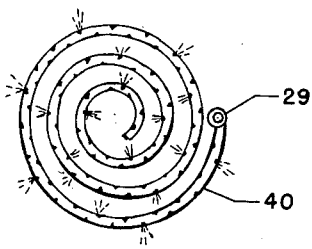
FIG. 3 is a reduced scale view corresponding to a portion of FIG. 2, but showing another form of solvent feed component.
Figure 4:
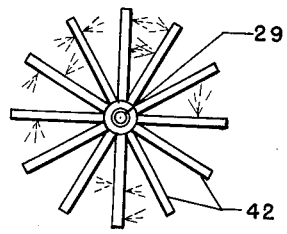
FIG. 4 is a view corresponding to FIG. 3, but of another form of the same component.

FIG. 3 illustrates by way of example another form of feed water dispersing or sealing table generating device which may be employed in accord with the present invention. In this case the water supply 29 connects into one end of a helically bent tube 40 which is perforated as indicated to spray liquid therefrom in all horizontal directions. Similarly, FIG. 4 shows another form of liquid feed dispersion device wherein the water supply conduit 29 connects into a series of radially extending tubes 42 which are perforated so as to spray water therefrom in all horizontal directions.

Figure 6:
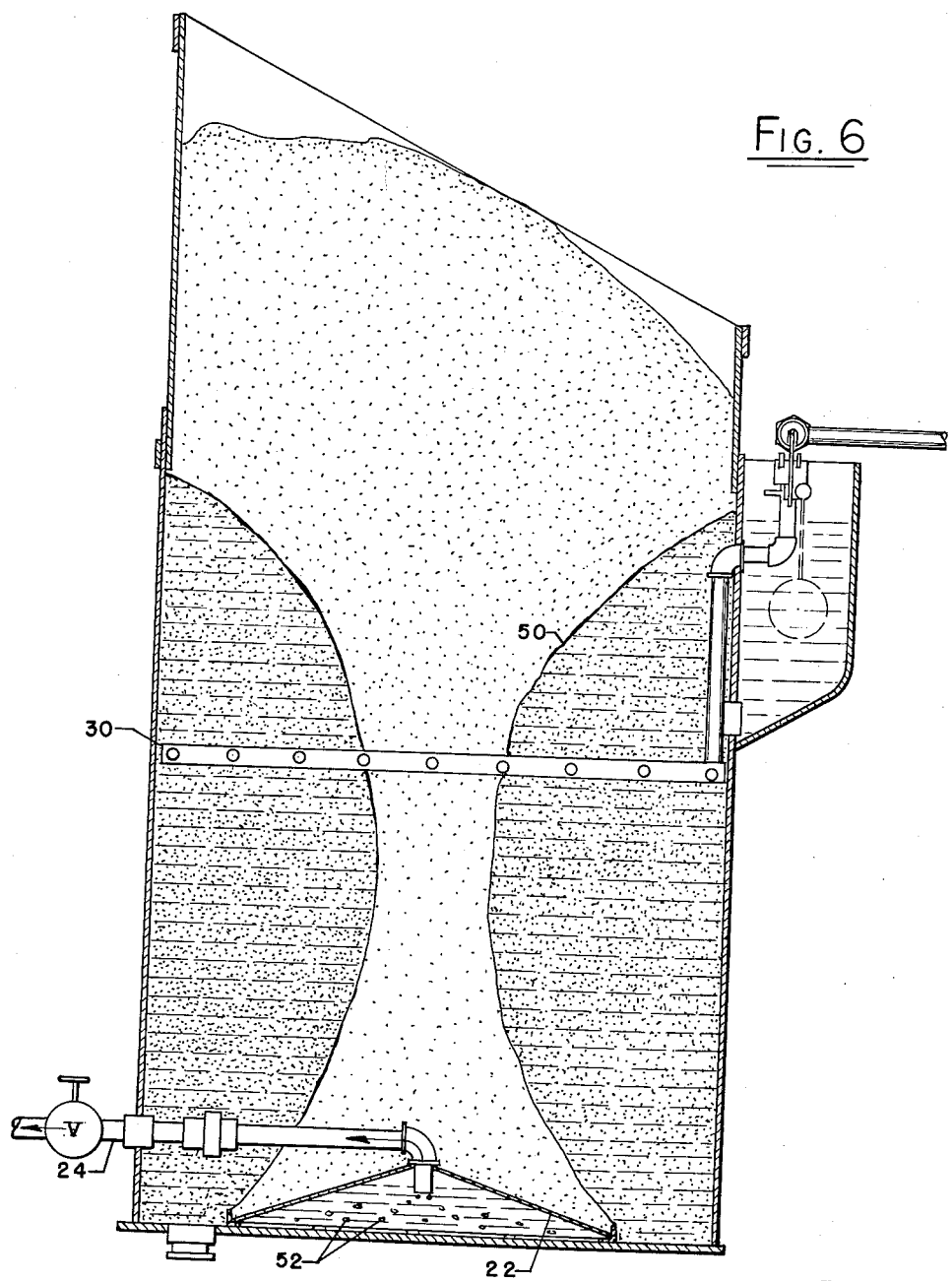
FIG. 6 is a schematic sectional view through a dissolver of conventional type, illustrating the action of the "critical rate" effect referred to hereinabove.

FIG. 6 illustrates perhaps in exaggeration, how in conventional type dissolvers the "critical rate" effect limits the practicable rate of brine withdrawal to below that anticipated in view of the pump and fresh solvent inlet capacities of the system. As shown at 50, when the brine withdrawal rate is increased to the critical rate, sufficient suction is produced at the brine inlet so that air from above the salt will be drawn down through the interstices of the mass into the brine beneath the canopy 22 as indicated at 52, and thence into the product brine. This is because air is more fluid and will flow in response to this suction more readily than brine will flow from the upper levels of the tank. However, as explained hereinabove, in the case of the present invention the liquid table which is established by the liquid feed manifold effectively seals off and prevents any air ingress to the brine withdrawal zone; thereby effectively increasing the practicable rate of brine withdrawal.

It will be appreciated that although only a few forms of the apparatus of the invention have been shown and described in detail, it will be apparent to those skilled in the art that the invention is not so limited but that various changes may be made therein without departing from the spirit of the invention or the scope of the appended claims.

I claim:

1. A down-flow type apparatus for preparation of aqueous salt solutions, comprising a tank having an upper dry-salt storage chamber portion, a brine withdrawal device having a brine inlet disposed adjacent the bottom of said tank at an elevation substantially below the salt supply level in said tank, a water feed device comprising a manifold for dispersing liquid having discharge portions extending throughout a major extent of the cross-sectional area of said tank, said manifold having a liquid supply inlet and having outlet openings in said discharge portion directed to discharge liquid in jet form in substantially horizontal directions thereby insuring liquid-flooding of a continuous horizontal zone of the feed salt supply disposed above the elevation of said brine inlet opening thereby liquid sealing said tank against air ingress from above to the brine conduit.

2. A down-flow type apparatus for preparation of liquids-solids solutions, comprising a tank having an upper solids storage chamber portion, a solution withdrawal device having a solution inlet disposed adjacent the bottom of said tank at an elevation substantially below the solids supply level in said tank, a solvent liquid feed device comprising a manifold for dispersing liquid having discharge portions extending throughout a major extent of the cross-sectional area of said tank, said manifold having a liquid supply inlet and having spray openings in said discharge portions directed to discharge liquid in substantially unbroken horizontal liquid layer within the mass of solids above the elevation of said brine inlet opening thereby liquid sealing said apparatus against air ingress from above to the brine conduit.

3. A down-flow type salt dissolving apparatus for preparation of salt solutions, comprising a tank having an upper dry salt storage chamber portion, a brine withdrawal device having a brine inlet disposed adjacent the bottom of said tank, a liquid feed device comprising a manifold for dispersing liquid having discharge portions extending throughout a major extent of the cross-sectional area of said tank, said manifold having a liquid supply inlet and having outlet openings in said discharge portions directed to discharge liquid so as to establish in a horizontal zone of the feed salt supply at an elevation above said brine inlet opening a continuous horizontal water table sealing said tank against air ingress from above to the brine conduit.

4. A down-flow type apparatus for preparation of liquids-solids solutions, comprising a tank having an upper solids storage chamber portion, a solution withdrawal device having a solution inlet disposed adjacent the bottom of said tank at an elevation substantially below the solids supply level in said tank, a solvent liquid feed device comprising a manifold for dispersing liquid, said manifold having a liquid supply inlet and having portions spanning the interior of said tank and formed with spray openings directed to discharge liquid in substantially horizontal directions thereby producing a substantially unbroken horizontal liquid layer within the mass of solids above the elevation of said brine inlet opening thereby liquid sealing said apparatus against air ingress from above to the brine conduit.

References Cited in the file of this patent

UNITED STATES PATENTS

| | | |
|---|---|---|
| 2,281,140 | Courthope et al. | Apr. 28, 1942 |
| 2,749,222 | Munroe | June 5, 1956 |
| 2,891,845 | Agnew | June 23, 1959 |